US010346617B1

(12) United States Patent
El Defrawy et al.

(10) Patent No.: US 10,346,617 B1
(45) Date of Patent: Jul. 9, 2019

(54) PROTOCOL FOR SECURELY SEARCHING STREAMING DATA WITH CONSTANT BANDWIDTH

(71) Applicant: HRL Laboratories, LLC, Malibu, CA (US)

(72) Inventors: Karim El Defrawy, Santa Monica, CA (US); Joshua W. Baron, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 931 days.

(21) Appl. No.: 14/877,918

(22) Filed: Oct. 7, 2015

Related U.S. Application Data

(63) Continuation-in-part of application No. 14/205,295, filed on Mar. 11, 2014, now Pat. No. 9,613,292, which is a continuation-in-part of application No. 13/749,683, filed on Jan. 25, 2010, now Pat. No. 9,009,089, which is a continuation-in-part of application No. 13/358,095, filed on Jan. 25, 2012, now Pat. No. 8,818,923.

(60) Provisional application No. 61/778,924, filed on Mar. 13, 2013, provisional application No. 61/591,207, filed on Jan. 26, 2012, provisional application No. 61/501,636, filed on Jun. 27, 2011.

(51) Int. Cl.
*G06F 21/60* (2013.01)
*H04L 29/06* (2006.01)
*G06F 16/951* (2019.01)
*G06F 16/2455* (2019.01)

(52) U.S. Cl.
CPC ...... *G06F 21/602* (2013.01); *G06F 16/24568* (2019.01); *G06F 16/951* (2019.01); *H04L 63/0428* (2013.01)

(58) Field of Classification Search
CPC .............. G06F 21/602; G06F 21/6254; G06F 17/30516; G06F 17/30864; G06F 17/30247; G06F 17/30985; H04L 63/0428; H04L 67/10; G06K 9/6201
USPC .......................................................... 706/18
See application file for complete search history.

(56) References Cited

U.S. PATENT DOCUMENTS 6,219,794 B1 * 4/2001 Soutar .................. H04L 9/0866
713/186
7,085,418 B2 8/2006 Kaneko et al.
(Continued)

OTHER PUBLICATIONS

Ostrovsky et al., "Private Searching on Streaming Data", J. Cryptology (2007) 20: 397-430.*

(Continued)

*Primary Examiner* — Dave Misir
(74) *Attorney, Agent, or Firm* — Tope-McKay & Associates

(57) ABSTRACT

Described is a system for securely searching streaming data. The system executes a secure pattern matching protocol between a client and at least one of a server and a processing element. Using the processing element, an encryption of a character delay based on a pattern to be searched is received. Streaming data is received at the processing element. A secure search is performed blindly at the processing element to find a match for the pattern in the streaming data, the search being performed using the encryption of the character delay vector. Encrypted results from the secure search are sent back to the client.

17 Claims, 3 Drawing Sheets

(56) References Cited

U.S. PATENT DOCUMENTS

| | | | |
|---|---|---|---|
| 7,599,894 B2 | 10/2009 | Owechko et al. | |
| 7,787,474 B2 | 8/2010 | Van Lunteren | |
| 8,068,431 B2 | 11/2011 | Varadarajan et al. | |
| 8,756,183 B1 | 6/2014 | Daily et al. | |
| 2004/0088722 A1* | 5/2004 | Peker | G06F 17/30787 725/19 |
| 2007/0140479 A1* | 6/2007 | Wang | H04L 9/008 380/30 |
| 2008/0005091 A1* | 1/2008 | Lawler | G06F 17/30592 |
| 2008/0294909 A1* | 11/2008 | Ostrovsky | G06F 17/30516 713/189 |
| 2009/0119518 A1* | 5/2009 | Staddon | G06F 21/6227 713/193 |
| 2009/0287624 A1 | 11/2009 | Rouat et al. | |
| 2010/0076919 A1* | 3/2010 | Chen | H04L 12/56 706/48 |
| 2010/0166320 A1 | 7/2010 | Paquier | |
| 2014/0121990 A1* | 5/2014 | Baldi | G06F 19/28 702/20 |

OTHER PUBLICATIONS

Erik Hjelmvik & Wolfgang John, "Statistical Protocol IDentification with SPID: Preliminary Results". SNCNW'09: 6th Swedish National Computer Networking Workshop, Uppsala, Sweden. May 4, 2009 <http://spid.sourceforge.net/sncnw09-hjelmvik_john-CR.pdf>.

Martin Roesch: Snort: Lightweight Intrusion Detection for Networks. LISA 1999 <http://dblp.dagstuhl.de/db/conf/lisa/lisa1999.html#Roesch99> : 229-238.

"Technical Details of I7-filter" 2006, website http://I7-filter.sourceforge.net/technicaldetails.

Khalife, J., Hajjar, A., & Diaz-Verdejo, J. (Nov. 2011). On the Performance of OpenDPI in Identifying P2P Truncated Flows. In AP2PS 2011, The Third International Conference on Advances in P2P Systems (pp. 79-84).

N. Cascarano, A. Este, F. Gringoli, F. Risso, and L. Salgarelli, "An Experimental Evaluation of the Computational Cost of a DPI Traffic Classifier", Proc. GLOBECOM'09, 2009, pp. 1-8. is related prior art.

Sipser, Introduction to the Theory of Computation. PWS, Boston. ISBN 0-534-94728-X. Section 1.1: Finite Automata, pp. 31-47, 1997.

A V Aho, M J Corasick, Efficient string matching: An aid to bibliographic search. Communications of the ACM, 18(6): 333-340, 1975.

EBayes TCP [Adaptive, Model-based Monitoring for Cyber Attack Detection. Keith Skinner & Alfonso Valdes. Lecture Notes in Computer Science, No. 1907. From Recent Advances in Intrusion Detection (RAID 2000). Edited by H. Debar and L. Me and F. Wu. Springer-Verlag, Toulouse, France. Oct. 2000. pp. 80-92.].

K. Koscher, A. Czeskis, F. Roesner, S. Patel, T. Kohno, S. Checkoway, D. McCoy, B. Kantor, D. Anderson, H. Shoehorn, S. Savage. Experimental Security Analysis of a Modern Automobile. The IEEE Symposium on Security and Privacy, Oakland, CA, May 16-19, 2010.

Michael Sipser, Introduction to the Theory of Computation. PWS, Boston. 1997. ISBN 0-534-94728-X. Section 1.1: Finite Automata, pp. 31-47.

T Kaneko, O Hori. Template matching method and image processing device. U.S. Pat. No. 7,085,418, 2006.

L. Di Stefano, S. Mattoccia, "A sufficient condition based on the Cauchy-Schwarz inequality for efficient Template Matching", IEEE Int. Conf. on Image Processing (ICIP 2003), Sep. 14-17, 2003, Barcelona, Spain.

L. G. Brown, "A survey of image registration techniques," ACM Comput. Surv., vol. 24, No. 4, pp. 325-376, 1992.

J. J. Hopfield, Neural networks and physical systems with emergent collective computational abilities, Proceedings of the National Academy of Sciences of the USA, vol. 79 No. 8 pp. 2554-2558, Apr. 1982.

P Wang, A DeNunzio, P Okunieff, WG O'Dell. Lung metastases detection in CT images using 3D template matching. Med. Phys. 34 (3), pp. 915, Mar. 2007.

Luigi di Stefano, Stefano Mattoccia, Federico Tombari, "An Algorithm for Efficient and Exhaustive Template Matching." Jan. 2004; In proceeding of Image Analysis and Recognition: International Conference, ICIAR 2004, Porto, Portugal, Sep. 29-Oct. 1, 2004, Proceedings, Part II.

R.S. Boyer, at al., "A fast string searching algorithm," Communications of the ACM, 20; 762-772, 1977.

M. Zubair, et al. "Text scanning approach for exact string matching," International Conference on Networking and Information Technology, 2010.

W. Maass, et al., "Real-time computing without stable states; a new framework for neural computation based on perturbations," Neural Computation 14(11); 2531-2560, 2002.

A. Waibel, et al., "Phoneme Recognition Using Time-Delay Neural Networks," IEEE Transactions on Acoustics, Speech, and Signal Porcessing, 37(3): 328-339, 1989.

J.L. Elman, "Finding structure in time," Cognitive Science, 14(2): 179-211, 1990.

E.M. Izhikevich, "Polychroniation: Computation with spikes," Neural Computation, 18(2): 245-282, 2006.

H. Pugam-Moisy, et al., "Delay learning and polychronization for reservoir computing," Neurocomputing, 71 (7-9): 1143-1158, 2008.

W. Maier, et al., "A Minimal Model for the Study of Polychronous Groups," arXiv:0806.1070v1 [Condensed Matter. Disordered Systems and Neural Networks], 2008.

Marina Blanton and Mehrdad Aliasgari. Secure outsourcing of dna searching via finite automata. In 24th annual IFIP WG 11.3 working conference on Data and applications security and privacy (DBSec'10), pp. 49-64, 2010.

Taher El Gamal. A public key cryptosystem and a signature scheme based on discrete logarithms. In Proceedings of CRYPTO 84 on Advances in cryptology, pp. 10-18, New York, NY, USA, 1985. Springer-Verlag New York, Inc.

Ronald Cramer, Rosario Gennaro, and Berry Schoenmakers. A secure and optimally efficient multi-authority election scheme. pp. 103-118. Springer-Verlag, 1997.

Ivan Damgård. Efficient concurrent zero-knowledge in the auxiliary string model. In Proceedings of the 19th International conference on Theory and application of cryptographic techniques, EUROCRYPT'00, pp. 418-430, Berlin, Heidelberg, 2000. Springer-Verlag.

Ivan Damgård and Mats Jurik. A generalisation, a simplification and some applications of paillier's probabilistic public-key system. In Proceedings of the 4th International Workshop on Practice and Theory in Public Key Cryptography: Public Key Cryptography, PKC '01, pp. 119-136, London, UK, 2001. Springer-Verlag.

Ivan Damgård and Claudio Orlandi. Multiparty computation for dishonest majority: from passive to active security at low cost. In Proceedings of the 30th annual conference on Advances in cryptology, CRYPTO'10, pp. 558-576, Berlin, Heidelberg, 2010. Springer-Verlag.

Jens Groth and Yuval Ishai. Sub-linear zero-knowledge argument for correctness of a shuffle. In Nigel Smart, editor, Advances in Cryptology—EUROCRYPT 2008, vol. 4965 of Lecture Notes in Computer Science, pp. 379-396. Springer Berlin / Heidelberg, 2008.

O. Goldreich, S. Micali, and A. Wigderson. How to play any mental game. In Proceedings of the nineteenth annual ACM symposium on Theory of computing, STOC '87, pp. 218-229, New York, NY, USA, 1987. ACM.

Juan A. Garay, Philip MacKenzie, and Ke Yang. Strengthening zero-knowledge protocols using signatures. In Proceedings of the 22nd international conference on Theory and applications of cryptographic techniques, EUROCRYPT'03, pp. 177-194, Berlin, Heidelberg, 2003. Springer-Verlag.

Carmit Hazay, Rosario Gennaro, and Jeffery Sorensen. Automata evaluation and text search protocols with simulation based security. In Public Key Cryptography, pp. 145-160, 2010.

(56) References Cited

OTHER PUBLICATIONS

Heiko Hoffmann, Michael Howard, and Michael Daily. Fast pattern matching with time-delayed neural networks. In International Joint Conference on Neural Networks (to appear), 2011.

Carmit Hazay and Yehuda Lindell. Efficient protocols for set intersection and pattern matching with security against malicious and covert adversaries. In Proceedings of the 5th conference on Theory of cryptography, TCC'08, pp. 155-175, Berlin, Heidelberg, 2008. Springer-Verlag.

Carmit Hazay and Tomas Toft. Computationally secure pattern matching in the presence of malicious adversaries. In ASIACRYPT, pp. 195-212, 2010.

Yuval Ishai, Manoj Prabhakaran, and Amit Sahai. Founding cryptography on oblivious transfer—efficiently. In Proceedings of the 28th Annual conference on Cryptology: Advances in Cryptology, CRYPTO 2008, pp. 572-591, Berlin, Heidelberg, 2008. Springer-Verlag.

Jonathan Katz and Lior Malka. Secure text processing with applications to private dna matching. In Proceedings of the 17th ACM conference on Computer and communications security, CCS '10, pp. 485-492, New York, NY, USA, 2010. ACM.

Knuth, Donald; Monis, James H., jr; Pratt, Vaughan (1977). "Fast pattern matching in strings". SIAM Journal on Computing 6(2): 323-350.

Richard M. Karp and Michael O. Rabin. Efficient randomized pattern-matching algorithms. IBM J. Res. Dev., 31:249-260, Mar. 1987.

K. Namjoshi and G. Narlikar. Robust and fast pattern matching for intrusion detection. In INFOCOM, 2010 Proceedings IEEE, pp. 1-9, Mar. 2010.

Pascal Paillier. Public-key cryptosystems based on composite degree residuosity classes. In Proceedings of the 17th international conference on Theory and application of cryptographic techniques, EUROCRYPT'99, pp. 223-238, 1999.

Torben P. Pedersen. Non-interactive and information-theoretic secure verifiable secret sharing. In Proceedings of the 11th Annual International Cryptology Conference on Advances in Cryptology, CRYPTO '91, pp. 129-140, London, UK, 1992. Springer-Verlag.

Structural joins: A primitive for efficient xml query pattern matching. In Proceedings of the 18th International Conference on Data Engineering, ICDE '02, pp. 141—, Washington, DC, USA, 2002. IEEE Computer Society.

Claus-Peter Schnorr. Efficient identification and signatures for smart cards. In Proceedings of the 9th Annual International Cryptology Conference on Advances in Cryptology, CRYPTO '89, pp. 239-252, London, UK, UK, 1990. Springer-Verlag.

Juan Ramón Troncoso-Pastoriza, Stefan Katzenbeisser, and Mehmet Celik. Privacy preserving error resilient dna searching through oblivious automata. In Proceedings of the 14th ACM conference on Computer and communications security, CCS'07, pp. 519-528, New York, NY, USA, 2007. ACM.

Tsung-Hsi Tsai. Average case analysis of the boyer-moore algorithm. Random Struct. Algorithms, 28:481-498, Jul. 2006.

Andrew C. Yao. Protocols for secure computations. In Proceedings of the 23rd Annual Symposium on Foundations of Computer Science, SFCS '82, pp. 160-164, Washington, DC, USA, 1982. IEEE Computer Society.

Andrew Chi-Chih Yao. How to generate and exchange secrets. In Proceedings of the 27th Annual Symposium on Foundations of Computer Science, pp. 162-167, Washington, DC, USA, 1986. IEEE Computer Society.

K. Koscher, A. Czeskis, F. Roesner, S. Patel, T. Kohno, S. Checkoway, D. McCoy, B. Kantor, D. Anderson, H. Shoehorn, S. Savage. Experimental Security Analysis of a Modern Automobile. The IEEE Symposium on Security and Privacy, Oakland, CA, May 16-19, 2010.

M. Sipser, "Introduction to the Theory of Computation," PWS, Boston, ISBN 0-534-94728-X, Section 1.1; Finite Automata, pp. 31-47, 1997.

A.V. Aho, et al., "Efficient string matching: An aid to bibliographic search," Communications of the ACM, 18(6): 333-340, 1975.

Notice of Allowance for U.S. Appl. No. 13/749,683 dated Dec. 10, 2014.

Joshua Baron, Karim El Defrawy, Kirill Minkovich, Rafail Ostrovsky, and Eric Tressler. 5PM: Secure Pattern Matching. Security and Cryptography for Networks. Lecture Notes in Computer Science, vol. 7485, pp. 222-240, 2012.

Office Action No. 1, for U.S. Appl. No. 13/358,095, dated Mar. 7, 2014.

Response to Office Action No. 1, for U.S. Appl. No. 13/358,095, dated Mar. 27, 2014.

Notice of Allowance for U.S. Appl. No. 13/358,095, dated Apr. 25, 2014.

Mirzaei et al. "A neural Network String Matcher", CAIP 2007, LNCS 4673, pp. 784-791.

Office Action No. 1, for U.S. Appl. No. 14/333,939, dated Mar. 12, 2015.

Response to Office Action No. 1, for U.S. Appl. No. 14/333,939, filed Jun. 11, 2015.

Lukosevicius et al. "Reservoir Computing Approaches to Recurrent Neural Network Training", Computer Science Review, vol. 3, Issue 3, 2009, pp. 127-149.

Office Action No. 2, for U.S. Appl. No. 14/333,939, dated Jul. 8, 2015.

Response to Office Action No. 2, for U.S. Appl. No. 14/333,939, filed Nov. 9, 2015.

Notice of Allowance for U.S. Appl. No. 14/333,939, filed Dec. 9, 2015.

Jonathan Katz and Lior Malka. (2010). Secure text processing with applications to private DNA matching. In Proceedings of the 17th ACM conference on Computer and communications security (CCS '10). ACM, New York, NY, USA, 485-492. DOI=10.1145/1866307.1866361.

Carmit Hazay, Rosario Gennaro, Jeffrey Sorensen, "Automata Evaluation and Text Search Protocols with Simulation Based Security," Cryptology ePrint Archive Report, 2010/484 (2010).

Mikhail J. Atallah, Florian Kerschbaum, and Wenliang Du. (2003). Secure and private sequence comparisons. In Proceedings of the 2003 ACM workshop on Privacy in the electronic society(WPES '03). ACM, New York, NY, USA, 39-44.

Mikhail J. Atallah and Jiangtao Li. 2005. Secure outsourcing of sequence comparisons. Int. J. Inf. Secur. 4, 4 (Oct. 2005), 277-287.

Juan Ramon Troncoso-Pastoriza, Stefan Katzenbeisser, and Mehmet Celik. (2007). Privacy preserving error resilient dna searching through oblivious automata. In Proceedings of the 14th ACM conference on Computer and communications security (CCS '07). ACM, New York, NY, USA, 519-528. DOI=10.1145/1315245.1315309.

Marina Blanton and Mehrdad Aliasgari. (2010). Secure outsourcing of DNA searching via finite automata. In Proceedings of the 24th annual IFIP WG 11.3 working conference on Data and applications security and privacy (DBSec'10), Sara Foresti and Sushi! Jajodia (Eds.). Springer-Verlag, Berlin, Heidelberg, 49-64.

Robert S. Boyer and J. Strother Moore. 1977. A fast string searching algorithm. Commun. ACM20, 10 (Oct. 1977), 762-772.

Alfred V. Aho and Margaret J. Corasick. 1975. Efficient string matching: an aid to bibliographic search. Commun. ACM 18, 6 (Jun. 1975), 333-340.

Knuth, D. E., Morris, J. H., & Pratt, V. R. (1977). Fast pattern matching in strings. SIAM Journal on Computing, 6(2), 323-350.

Hazay, C. and Toft, T. 2010. Computationally Secure Pattern Matching in the Presence of Malicious Adversaries. ASIACRYPT 2010.

Office Action 1 for U.S. Appl. No. 14/205,295. dated Jun. 3, 2016.

Response to Office Action 1 for U.S. Appl. No. 14/205,295. dated Nov. 3, 2016.

Notice of Allowance for U.S. Appl. No. 14/205,295. dated Nov. 28, 2016.

Landau G. et al., "Pattern Matching in a Digitized Image", Algorithmica, 1994, 12, pp. 375-408.

(56) References Cited

OTHER PUBLICATIONS

Wei L. et al., "Third-Party DFA Evaluation on Encrypted Files", Tech. Rep. TR11-005, Depart of Computer Science, University of North Carolina at Chapel Hill, 2011.

Joshua Baron, Karim El Defrawy, Kirill Minkovich, Rafail Ostrovsky, Eric Tresler. 5PM: Secure Pattern Matching. SCN 2012, pp. 1-51. Full version available at http://eprint.iacr.org/2012/689.pdf.

Craig Gentry. Fully Homomorphic Encryption Using Ideal Lattices. STOC 2009, pp. 169-178.

Payman Monassel, Salman Niksefat, Saeed Sadeghian, Babak Sadeghiyan. An Efficient Protocol for Oblivious DFA Evalutation and Applications. CT-RSA 2012, pp. 1-20.

Rafail Ostrovsky and William E. Skeith, III. Private Searching on Streaming Data J. Cryptology 2007, pp. 1-35.

Damien Vergnaud. Generalized Pattern Matching via Fast Fourier Transform. AFRICACRYPT 2011, pp. 41-58.

\* cited by examiner

US 10,346,617 B1

PROTOCOL FOR SECURELY SEARCHING STREAMING DATA WITH CONSTANT BANDWIDTH

CROSS-REFERENCE TO RELATED APPLICATIONS

This is a Continuation-in-Part application of U.S. Non-Provisional application Ser. No. 14/205,295, filed in the United States on Mar. 11, 2014, entitled, "Secure Multi-Dimensional Pattern Matching for Secure Image Search and Recognition," which is a Non-Provisional patent application of U.S. Provisional Patent Application No. 61/778,924, filed in the United States on Mar. 13, 2013, entitled, "Secure Multi-Dimensional Pattern Matching for Secure Image Search and Recognition," all of which are hereby incorporated by reference as though fully set forth herein. U.S. Non-Provisional application Ser. No. 14/205,295 is a Continuation-in-Part application of U.S. Non-Provisional application Ser. No. 13/749,683, filed in the United States on Jan. 25, 2013, entitled, "Secure Pattern Matching," now issued as U.S. Pat. No. 9,009,089, which is a Non-Provisional application of U.S. Provisional Application No. 61/591,207, filed in the United States on Jan. 26, 2012, entitled, "Secure Pattern Matching," all of which are hereby incorporated by reference as though fully set forth herein. U.S. Non-Provisional application Ser. No. 13/749,683 is also a Continuation-in-Part of U.S. Non-Provisional application Ser. No. 13/358,095, filed in the United States on Jan. 25, 2012, entitled, "Neural Network Device with Engineered Delays for Pattern Storage and Matching," now issued as U.S. Pat. No. 8,818,923, which is a Non-Provisional Application of U.S. Provisional Application No. 61/501,636, filed in the United States on Jun. 27, 2011, entitled, "Neural Network Device with Engineered Delays for Pattern Storage and Matching," all of which are hereby incorporated by reference as though fully set forth herein.

FIELD OF INVENTION

The present invention relates to a system for securely searching streaming data and, more particularly, to a system for securely searching streaming data that may support multiple matching modes.

BACKGROUND OF THE INVENTION

Existing approaches to securely search databases or perform secure pattern matching fall short, because they are only secure under the honest-but-curious (HBC) model, and they can only perform exact matching. Schemes based on fully homomorphic encryption (FHE) are currently impractical to be implemented. For example, referring to the List of Incorporated Literature References, Literature Reference No. 4 describes only exact matching; Literature Reference No. 5 is impractical for streaming (i.e., requires linear bandwidth); Literature Reference No. 3 discloses only exact matching; and Literature Reference No. 2 is currently impractical because it requires high computational overhead.

Thus, a continuing need exists for a system that securely searches streaming data using multiple pattern matching modes and which only requires a constant amount of communication proportional to the pattern size being matched and independent of the data stream size.

SUMMARY OF THE INVENTION

The present invention relates to a system for securely searching streaming data and, more particularly, to a system for securely searching streaming data that supports multiple matching modes. The system comprises one or more processors and a memory having instructions such that when the instructions are executed, the one or more processors perform multiple operations. A secure pattern matching protocol is executed between a client and at least one of a server and a processing element. Using the processing element, an encryption of a character delay based on a patter to be searched is received. Streaming data is received at the processing element. A secure search is performed blindly at the processing element to find a match for the pattern in the streaming data, the search being performed using the encryption of the character delay vector. Encrypted results from the secure search are sent back to the client.

In another aspect, performing the secure search includes constructing an activation vector by converting the encryption of a selected value from each of the at least one character delay vectors into an output encryption that is the product of plaintexts.

In another aspect, the secure pattern matching protocol supports a plurality of matching modes, wherein the plurality of matching modes comprises exact matching, single character wildcards matching, and matching over arbitrary alphabets.

In another aspect, the secure pattern matching protocol is secure against an honest-but-curious (HBC) adversary model.

In another aspect, the streaming data is searched in a set of consecutive windows of a fixed length.

In another aspect, for a window $T_{(j)}$ at time j in the set of consecutive windows, the server sends the client $res_j$, which reveals whether or not window $T_{(j)}$ contains a match and reveals no other information.

In another aspect, the client uses $res_j$ to determine whether and where p matches $T_{(j)}$.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
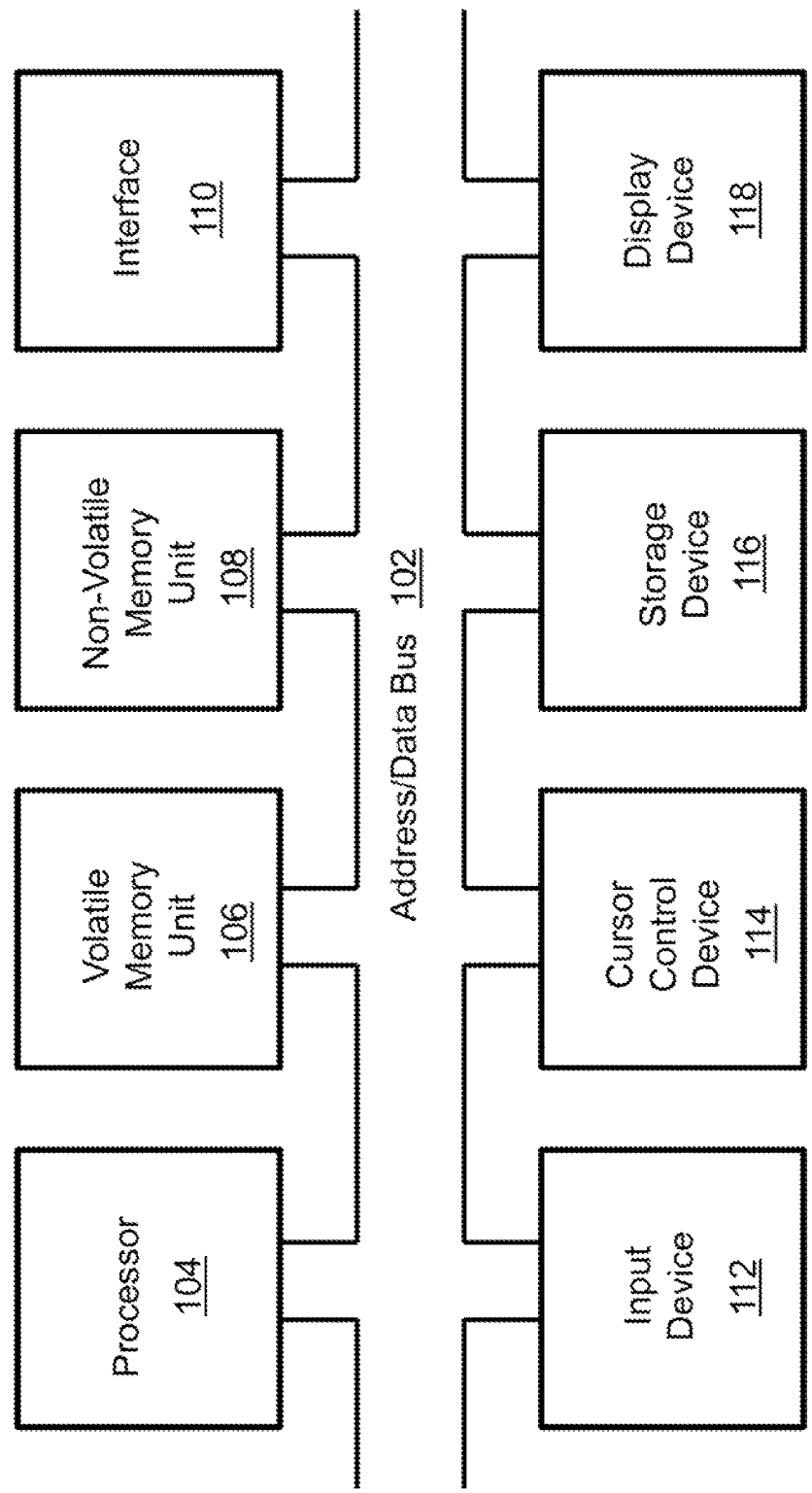
FIG. 1 is a block diagram depicting the components of a system for securely searching streaming data according to some embodiments of the present disclosure.

The present invention relates to a system for securely searching streaming data and, more particularly, to a system for securely searching streaming data that may support multiple matching modes. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of incorporated literature references as used in the description is provided. Next, a description of various principal aspects of the present invention is provided. Finally, specific details of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Joshua Baron, Karim El Defrawy, Kirill Minkovich, Rafail Ostrovsky, Eric Tresler. 5 PM: Secure Pattern Matching. SCN 2012.
2. Craig Gentry. Fully Homomorphic Encryption Using Ideal Lattices. STOC 2009.
3. Payman Mohassel, Salman Niksefat, Saeed Sadeghian, Babak Sadeghiyan. An Efficient Protocol for Oblivious DFA Evaluation and Applications. CT-RSA 2012.
4. Rafail Ostrovsky and William E. Skeith, III. Private Searching on Streaming Data. J. Cryptology 2007.
5. Damien Vergnaud. Generalized Pattern Matching via Fast Fourier Transform. AFRICACRYPT 2011.

(2) Principal Aspects

The present invention has three "principal" aspects. The first is a system for securely searching streaming data. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein. The one or more processors may have an associated memory with executable instructions encoded thereon such that when executed, the one or more processors perform multiple operations. The associated memory is, for example, a non-transitory computer readable medium.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device, such as the user interface, a camera and/or radar, or any combination of devices that provide the functionalities as described herein. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
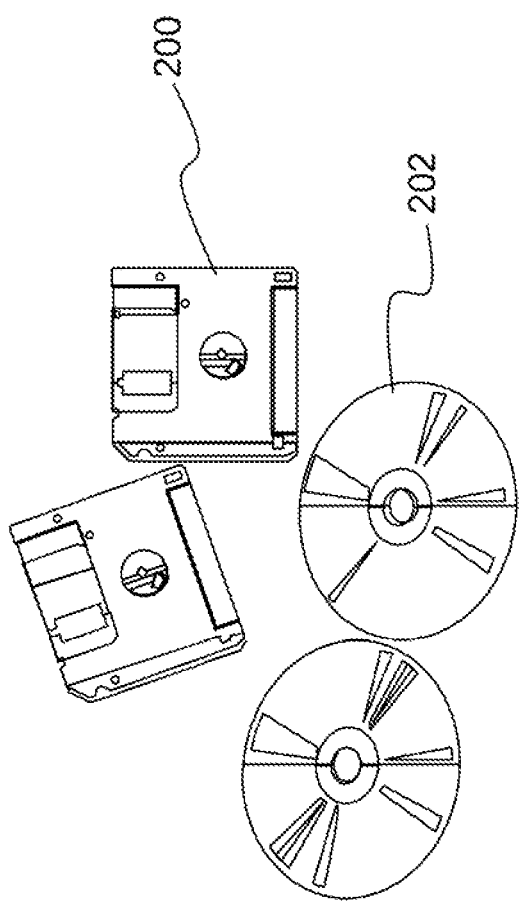
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of the Invention

Current state-of-the-art in securely searching streaming data can only perform exact matching (i.e., find out if (and locations where) a pattern exactly matches the text). However, in the vast majority of search use cases (e.g., social media, biometric information, video and images), errors in the data are common, and exact matching is too restrictive in such practical settings. Therefore, the present invention greatly increases the utility of secure pattern matching to real-world "big data" settings.

Figure 3:
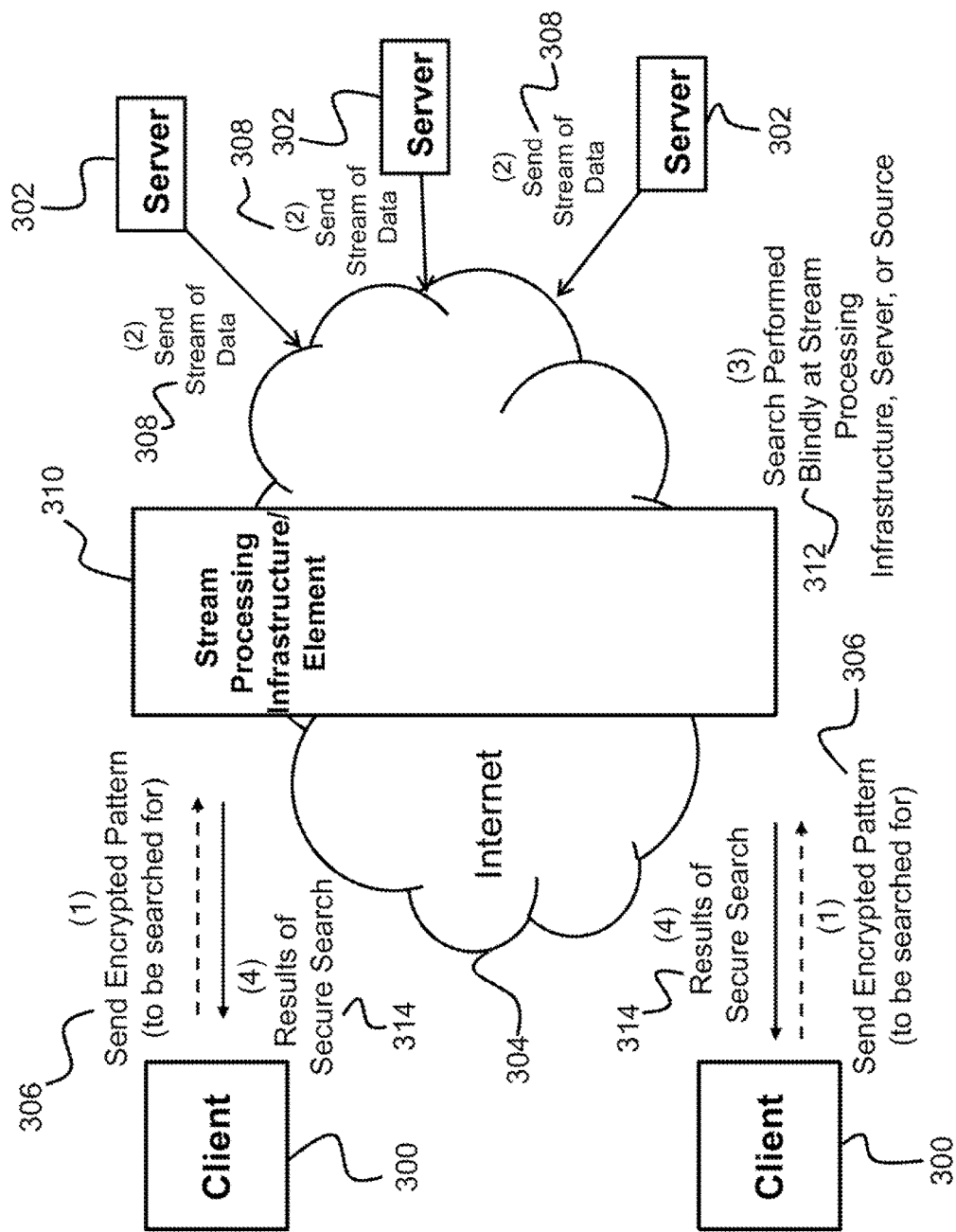
FIG. 3 is an illustration of securely searching streaming data according to some embodiments of the present disclosure.

The system according to some embodiments of the present disclosure performs exact pattern matching as well as pattern matching with single-character wildcards (also known as "don't cares"). FIG. 3 depicts a non-limiting example of securely searching streaming data according to some embodiments of the present disclosure. A secure pattern matching protocol is executed between a client 300 and a server 302. Clients 300 and servers 302 communicate over the Internet 304 on separate hardware, but both the client 300 and the server 302 may reside in the same network. The client 300 possesses a pattern.

In a first operation 306 of the process, client 300 sends an encrypted pattern to be searched to the stream processing infrastructure 310 or a server 302. The server 302 possesses data that may include streaming text, audio, video, or other data. In an optional second operation 308, the server 302 may send the stream of data to the stream processing infrastructure 310. Note that the server 302 in the envisioned setting is just a logical entity or hardware. In reality, it is possible for it to be a distributed stream processing infrastructure 310 (e.g., Facebook™ and Twitter™'s stream processing infrastructure) which is implemented using distributed stream processing open source software and frameworks, such as Apache S4 or Storm (produced by The Apache Software Foundation).

In a third operation 312, a search is performed blindly at the stream processing infrastructure 310, the server 302, or a source, which could be a sensor, smart phone, drone, or any other source of data. In a fourth operation 314, the encrypted results of the secure search are sent back to the client 300.

The most common interpretation of the pattern matching problem is the following: given a finite alphabet $\Sigma$, a text $T \in \Sigma^n$ of length n and a pattern $p \in \Sigma^m$ of length m, the exact pattern matching decision problem requires one to decide whether or not a pattern appears in the text. The exact pattern matching search problem requires finding all indices i of T (if any) where p occurs as a substring starting at position i of the text T. If $T_i$ denotes the $i^{th}$ character of the text T, and p denotes the pattern to be searched for in T, then the output should be the set of matching positions MP, such that MP:={i∈p matches T beginning at $T_i$}, i.e., the set MP contains all positions i where the pattern p matches the text T starting at character $T_i$. In the streaming model according to some embodiments of the present disclosure, a client possesses a pattern p and sends an encryption of it, e(p), to a server (or a processing element). If the processing is performed at the server, then it is the one referred to here. If a processing element receives the stream from the server, then it is the processing element referred to here. The server's streaming text is very large and can only be considered in consecutive windows (or blocks) of fixed length. For each window j, the server (or a processing element) sends the client $res_j$, which reveals whether or not the window contains a match and reveals no other information about the data.

While the protocol is between a client 300 and a server 302, in the streaming case it should be noted that the server 302 may not possess all data; rather, there may be a separate entity, the Data Source, which provides data to the server 302 in segments. The server 302 will process this data in windows, which for the purpose of this protocol is a fixed amount of data W.

More precisely, the client 300 possesses a pattern $p \in \{\Sigma \cup \{*\}\}^m$, the Data Source possesses a data string $T \in \{0,1\}^n$ for n>>0, and the server 302 possesses a window of data at time j, $T_{(j)}$, of the form $(T_{jW+1}, \ldots, T_{(j+1)W})$. Note that the data windows as defined here do not overlap; this is for simplicity of notation. Without loss of generality, the data windows can (and should) be structured such that segmenting the data in windows does not mean loss of a possible pattern match. The secure streaming pattern matching functionality that the present invention addresses is the following:

Initialization phase: Client 300 formats an encrypted pattern e(p) from p and sends e(p) to Server 302.
Computation Phase: For each window of data $T_{(j)} = (T_{jW+1}, \ldots, T_{(j+1)W})$:
  1. Server 302 computes using inputs $T_{(j)}$ and e(p) to obtain $res_j$. Server sends $res_j$ to Client 300.
  2. Client 300 computes using input $res_j$ to determine whether (and where) p matches $T_j$.
Client Output: If (and where) p matches $T_j$
Server Output: Nothing.

The system described herein is secure against an adversary model referred to as the honest-but-curious (HBC) adversary model (also called semi-honest in the literature). In this adversary model, parties may not deviate from the protocol specifications but may use received data to attempt to discover the other party's inputs (or any information about it or related to it). For instance, an adversarial client 300 must follow protocol specifications, but may use data obtained during the protocol to try to determine information about the server's 302 text other than whether the pattern matches or not. Note that the Data Source is not viewed as a party for the purposes of this protocol.

In order to construct the secure pattern matching protocol according to some embodiments of the present disclosure, a somewhat homomorphic encryption scheme (SHE) is used (i.e., one that allows an unlimited number of additions and a constant number of multiplications). In what follows, all arithmetic and elements are over the finite field of q elements, $Z_q$, where q is a sufficiently large prime. A SHE scheme is a public key encryption scheme. For example, the public key pk is publicly known while the secret key sk is held only by the party that decrypts. For the purpose of this document, SHE includes five protocols: a KeyGen protocol, an Enc protocol, a Dec protocol, an Add protocol, and a lMult protocol, as described below.

1. KeyGen(n) generates a public/private key pair on input the security parameter n.
2. Enc(m,pk,r) encrypts message m with public key pk and random input r.
3. Dec(c,sk) decrypts encrypted message c; note that m=Dec(Enc(m,pk,r),sk).
4. Add(t, $s_1, \ldots, s_t$) takes as input t encrypted values (for any natural number t) and outputs the encrypted value that is encryption of the sum of the plaintexts. In other words,
   Add(t, Enc($m_1$, pk, $r_1$), . . . , Enc($m_t$, pk, $r_t$))=Enc($\sum_{i=1}^{t} m_i$, pk, r) for some r.
5. lMult(l, t, $s_1, \ldots, s_t$) takes as input t encrypted values (for 0≤t≤l) and outputs the encrypted value that is the encryption of the product of the plaintexts. In other words,
   lMult(t, Enc($m_1$, pk, $r_1$), . . . , Enc($m_t$, pk, $r_t$))=Enc($\prod_{i=1}^{t} m_i$, pk, r) for some r.

The protocol according to some embodiments of the present disclosure will use the following notation and constructions to discuss pattern and text data.

1. For each character of the pattern $p \in \{\Sigma \cup \{*\}\}^m$, the client 300 constructs a vector, here termed a character delay vector (CDV), of length equal to the pattern length, m. These vectors are initialized with zeros. In what follows, the DNA alphabet with a wildcard, {A,C,G,T,*} is used. For example, if the pattern is: "TA*CT" over $\Sigma$, then the CDVs will be initialized to: CDV(A)=[0,0,0,0,0], CDV(C)=[0,0,0,0,0], CVD(G)=[0,0,0,0,0] and CDV(T)=[0,0,0,0,0].

2. For each pattern character $p_i$ (i∈{1, . . . , m}), a delay value, $d_{p_i}^r$, is computed to be the number of characters from $p_i$ to the end of the pattern, (i.e., $d_{p_i}^r$=m–i for the rth occurrence of $p_i$ in p). The $d_{p_i}^r$ th position of CDV ($p_i$) is set to 1. Finally, for every j such that $p_j$=*, the m–j position of every CDV vector is set to 1. For example the CDVs of TA*CT would be:
CDV(A)[0,0,1,1,0] because $d_A^1$=5–2=3 and there is a * at $p_3$
CDV(C)=[0,1,1,0,0] because $d_C^1$=5–4=1 and there is a * at $p_3$
CDV(G)=[0,0,1,0,0] because G∉p and there is a * at $p_3$
CDV(T)=[1,0,1,0,1] because $d_T^1$=5–5=0, $d_T^2$=5–1=4 and there is a * at $p_3$.

Outlined below is an insecure process by which pattern matching can be performed in the clear:
1. Instead of sending the pattern p to the server 302, the client 300 sends a |$\Sigma$| by m matrix $M_{CDV}$, where the ith row of $M_{CDV}$ is the CDV vector for the ith character of Σ (written lexicographically).

2. An activation vector (AV) is initialized to be the all 0 vector of length W−m, where W is the length of the text that the server 302 is currently considering.

3. For each character $T_i$ of T to be considered i≥m−1, the server 302 utilizes the m CDV vectors $CDV[T_{i-m+1}]$, ..., $CDV[T_i]$ and sets AV(i−m)=CDV$[T_{i-m+1}]_{m-1}$*CDV$[T_{i-m+2}]_{m-2}$* ... *CDV $[T_i]_0$. Note that AV(i−m)=1 if and only if each of the corresponding CDV positions in the product equals 1; otherwise, it equals 0.

The above procedure will output the correct matching locations; that is, if AV(i) equals 1, then $T_{i+m}$ matches p. The reason is that each corresponding element of the CDV product yields a 1 if and only if the corresponding character of T is the same character in the same place as for p. Put another way, the CDV vectors place 1s optimistically where a match could possibly occur. All CDVs place a 1 in the position corresponding to * because all characters match for *.

Described below is a more detailed description of the protocol according to some embodiments of the present disclosure, referred to as the 5 PMS protocol, that performs secure pattern matching on streaming data. The protocol is specified at a stage j. At each stage, the Data Source provides the server 302 with a window of text of length W. An mSHE encryption scheme is used (e.g., one that allows m multiplications and an unlimited number of additions). It is assumed that the server 302 (or processing element) already possesses public key pk, while the client 300 possesses secret key sk. In what follows, for simplicity, E(x) will be referred to as the encryption of message x under the mSHE scheme; neither the public key nor the randomness used is specified. Likewise, D(s) refers to the decryption of encrypted message s, without specifying the secret key sk. The 5 PMS protocol is as follows:

Client 300 input: p∈{Σ∪{*}}$^m$, public key pk, secret key sk.
Server 302 (or processing element) input: At stage j, a window of text T∈Σ$^W$, public key pk.
Initialization (stage 0):
 1. Client 300, using p, constructs the matrix $M_{CDV}$. Client 300 encrypts $M_{CDV}$ element-wise; denote this matrix E($M_{CDV}$). Client 300 sends E($M_{CDV}$) to Server 302.
At each stage j:
 1. Server 302 (or processing element) constructs an activation vector, denoted EAV equal to all 0s of length W−m. For m≤i≤W, Server 302 computes
  $EAV_{i-m}$=mMult(m, E $(CDV[T_{i-m+1}]_{m-1})$, ..., E(CDV $[T_i]_0$)).
 2. Server 302 computes $EA_j$=Add(W, $EAV_0$, ..., $EAV_{W-m-1}$). Server 302 sends EA to Client 300.
 3. Client 300 computes $ans_j$=Dec($EA_j$). If $ans_j$≠0, then there exists a pattern match in the jth text window; otherwise, $ans_j$=0, and no pattern match occurred in the text window.
Stage j Client 300 Output: Stage number j, matching locations in T.
Stage j Server 302 Output: Nothing.

The computational complexity of the initialization is |Σ|*m calls to Enc; communication complexity is |Σ|*m ciphertexts. The per-stage computational complexity for the server 302 is O(W) calls to mMult (with m multiplied elements in each call), with one call to Add (with W added elements in each call). The per-stage computational complexity for the client 300 is one call to Dec. Per-stage communication complexity is one ciphertext.

Security of the scheme follows the security of the mSHE scheme, as well as from that fact that no partial information about the text is revealed, non-matching results yield 0s. Note that $EA_j$, equals an encryption of 0 if and only if every element of EAV equals an encryption of 0, which occurs if and only if no pattern match occurs.

The system described herein has many application in the intelligence community. For instance, the present invention can be used to search for trends in large publicly available data sources that may help predict social unrest and/or financial instability. Additionally, the present invention may be used to execute searches for sensitive subjects on Intelligence Surveillance and Reconnaissance (ISR) platforms (e.g., drones and unmanned aerial vehicles (UAVs)). ISR platforms have the capability to generate gigabytes of data per second. Instead of sending all this data off-platform, the platform can process it in real-time and only send back relevant data about particular targets. If the targets are sensitive, they must be stored encrypted on the platform. The system described herein consists of a basis for constructing such a technology, where the targets (and the search results) are not revealed even if the platform is captured or the data transmissions are intercepted.

Further, the system according to some embodiments of the present disclosure can be utilized to monitor, in a privacy-preserving manner, for real-time analytics of on-board sensors (e.g., event data recorders (EDRs) on vehicles, and aircraft use data). For instance, one could run proprietary analytics without having to offload any of the data and without revealing the analytics.

In summary, the system according to the principles is a protocol that can perform secure searching and matching of patterns on streaming data. The protocol supports several searching/matching modes including exact matching, single character wildcard matching, and matching over arbitrary alphabets. Furthermore, the protocol only requires a constant amount of communication proportional to the pattern size being matched and independent of the data stream size (or the block thereof that is being considered), which can be extremely large. Additionally, it is secure in the honest-but-curious adversary model (i.e., where parties involved in the protocol cannot discover other parties' inputs from normal protocol interactions).

What is claimed is:

1. A system for securely searching on-board sensor streaming data, the system comprising:
 an event data recorder on a vehicle having an on-board sensor, wherein the event data recorder is configured to record streaming data from the on-board sensor; and
 one or more processors having associated memory with executable instructions encoded thereon such that when executed, the one or more processors perform an operation of:
 executing a secure pattern matching protocol between a client and at least one of a server and a processing element;
 wherein the secure pattern matching protocol includes the following operations:
  for each character of a pattern p, constructing, by the client, a character delay vector having a length equal to a length of the pattern p;
  encrypting each character delay vector using an encryption scheme, resulting in an encryption of each character delay vector;
  using the processing element, receiving from the client the encryption of at least one character delay vector that is based on the pattern p to be searched;

receiving the on-board sensor streaming data from the event data recorder at the processing element;

blindly performing a secure search at the processing element to find a match for the pattern p in the on-board sensor streaming data, the search being performed using the encryption of the at least one character delay vector, wherein performing the secure search includes constructing an activation vector by converting the encryption of a selected value from each of the at least one character delay vectors into an output encryption that is the product of plaintexts; and sending a set of encrypted results from the secure search back to the client for monitoring, in a privacy-preserving manner, real-time analytics of the on-board sensor.

2. The system as set forth in claim 1, wherein the secure pattern matching protocol supports a plurality of matching modes, wherein the plurality of matching modes comprises exact matching, single character wildcards matching, and matching over arbitrary alphabets.

3. The system as set forth in claim 1, wherein the secure pattern matching protocol is secure against an honest-but-curious (HBC) adversary model.

4. The system as set forth in claim 1, wherein the on-board sensor streaming data is searched in a set of consecutive windows of a fixed length.

5. The system as set forth in claim 4, wherein for a window $T_{(j)}$ at time j in the set of consecutive windows, the server sends the client $res_j$, which reveals whether or not window $T_{(j)}$ contains a match for the pattern in the on-board sensor streaming data and reveals no other information.

6. The system as set forth in claim 5, wherein the client uses $res_j$ to determine whether and where p matches $T_{(j)}$.

7. A computer-implemented method for securely searching on-board sensor streaming data, comprising an act of causing a data processor to execute instructions stored on a non-transitory memory such that upon execution, the data processor performs an operation of:

executing a secure pattern matching protocol between a client and at least one of a server and a processing element;

wherein the secure pattern matching protocol includes the following operations:

for each character of a pattern p, constructing, by the client, a character delay vector having a length equal to a length of the pattern p;

encrypting each character delay vector using an encryption scheme, resulting in an encryption of each character delay vector;

using the processing element, receiving from the client the encryption of at least one character delay vector that is based on the pattern p to be searched;

receiving the on-board sensor streaming data from an event data recorder on a vehicle having the on-board sensor at the processing element;

blindly performing a secure search at the processing element to find a match for the pattern p in the on-board sensor streaming data, the search being performed using the encryption of the at least one character delay vector, wherein performing the secure search includes constructing an activation vector by converting the encryption of a selected value from each of the at least one character delay vectors into an output encryption that is the product of plaintexts; and sending a set of encrypted results from the secure search back to the client for monitoring, in a privacy-preserving manner, real-time analytics of the on-board sensor.

8. The method as set forth in claim 7, wherein the secure pattern matching protocol supports a plurality of matching modes, wherein the plurality of matching modes comprises exact matching, single character wildcards matching, and matching over arbitrary alphabets.

9. The method as set forth in claim 7, wherein the secure pattern matching protocol is secure against an honest-but-curious (HBC) adversary model.

10. The method as set forth in claim 7, wherein the on-board sensor streaming data is searched in a set of consecutive windows of a fixed length.

11. The method as set forth in claim 10, wherein for a window $T_{(j)}$ at time j in the set of consecutive windows, the server sends the client $res_j$, which reveals whether or not window $T_{(j)}$ contains a match for the pattern in the on-board sensor streaming data and reveals no other information.

12. The method as set forth in claim 11, wherein the client uses $res_j$ to determine whether and where p matches $T_{(j)}$.

13. A computer program product for securely searching on-board sensor streaming data comprising computer-readable instructions stored on a non-transitory computer-readable medium that are executable by a computer having a processor for causing the processor to perform operations of:

executing a secure pattern matching protocol between a client and at least one of a server and a processing element;

wherein the secure pattern matching protocol includes the following operations:

for each character of a pattern p, constructing, by the client, a character delay vector having a length equal to a length of the pattern p;

encrypting each character delay vector using an encryption scheme, resulting in an encryption of each character delay vector;

using the processing element, receiving from the client the encryption of at least one character delay vector that is based on the pattern p to be searched;

receiving the on-board sensor streaming data from an event data recorder on a vehicle having the on-board sensor at the processing element;

blindly performing a secure search at the processing element to find a match for the pattern p in the on-board sensor streaming data, the search being performed using the encryption of the at least one character delay vector, wherein performing the secure search includes constructing an activation vector by converting the encryption of a selected value from each of the at least one character delay vectors into an output encryption that is the product of plaintexts; and sending a set of encrypted results from the secure search back to the client for monitoring, in a privacy-preserving manner, real-time analytics of the on-board sensor.

14. The computer program product as set forth in claim 13, wherein the secure pattern matching protocol is secure against an honest-but-curious (HBC) adversary model.

15. The computer program product as set forth in claim 13, wherein the on-board sensor streaming data is searched in a set of consecutive windows of a fixed length.

16. The computer program product as set forth in claim 15, wherein for a window $T_{(j)}$ at time j in the set of consecutive windows, the server sends the client $res_j$, which reveals whether or not window $T_{(j)}$ contains a match for the pattern in the on-board sensor streaming data and reveals no other information.

17. The computer program product as set forth in claim 16, wherein the client uses $res_j$ to determine whether and where p matches $T_{(j)}$.

\* \* \* \* \*